US012330767B2

(12) United States Patent
Song et al.

(10) Patent No.: US 12,330,767 B2
(45) Date of Patent: Jun. 17, 2025

(54) WING LOAD SUPPORT STRUCTURE OF THE FUSELAGE

(71) Applicants: Hyundai Motor Company, Seoul (KR); Kia Corporation, Seoul (KR)

(72) Inventors: Won Ki Song, Seongnam-si (KR); Jung Jong Chun, Seoul (KR); Dae Hee Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/516,428

(22) Filed: Nov. 21, 2023

(65) Prior Publication Data

US 2024/0336347 A1 Oct. 10, 2024

(30) Foreign Application Priority Data

Apr. 4, 2023 (KR) .................. 10-2023-0043911

(51) Int. Cl.
*B64C 1/26* (2006.01)
*B64C 1/06* (2006.01)
*B64C 1/10* (2006.01)
*B64C 3/18* (2006.01)

(52) U.S. Cl.
CPC ............ *B64C 1/26* (2013.01); *B64C 1/061* (2013.01); *B64C 1/10* (2013.01); *B64C 3/185* (2013.01); *B64C 3/187* (2013.01)

(58) Field of Classification Search
CPC .. B64C 1/26; B64C 1/061; B64C 1/10; B64C 3/185; B64C 3/187
See application file for complete search history.

(56) References Cited

U.S. PATENT DOCUMENTS

| | | | | | |
|---|---|---|---|---|---|
| 1,808,842 | A | * | 6/1931 | Fedor | B64C 3/00 244/123.8 |
| 3,499,622 | A | * | 3/1970 | Surcin | B64C 1/26 244/130 |
| 3,942,746 | A | * | 3/1976 | Carter | B64C 1/0009 244/113 |
| 4,310,132 | A | * | 1/1982 | Frosch | B64C 1/068 244/119 |
| 4,448,372 | A | * | 5/1984 | Larson | B64C 1/26 244/119 |

(Continued)

FOREIGN PATENT DOCUMENTS

| JP | 2015-016855 A | 1/2015 |
|---|---|---|
| JP | 2018-172101 A | 11/2018 |

(Continued)

*Primary Examiner* — Medhat Badawi
(74) *Attorney, Agent, or Firm* — Banner & Witcoff, Ltd.

(57) ABSTRACT

A wing load support structure of a fuselage includes a first joint on a front spar of a wing unit of the fuselage, a center bulk head including a first spar joint coupled to the first joint and configured to support a vertical load of the front spar transmitted by the wing unit, a second joint mounted on a rear spar of the wing unit, a spar cover including a second spar joint coupled to the second joint and connected to a rear bulk head by a bulk head upper support, and a support unit configured to support the spar cover and the rear bulk head inside the fuselage and configured to support a vertical load of the rear spar transmitted by the wing unit.

16 Claims, 10 Drawing Sheets

(56) References Cited

U.S. PATENT DOCUMENTS

| | | | | |
|---|---|---|---|---|
| 5,024,399 | A * | 6/1991 | Barquet | B29C 70/44 244/119 |
| 6,708,924 | B2 * | 3/2004 | Page | B64C 39/10 244/36 |
| 7,303,374 | B2 * | 12/2007 | Li | B64C 27/473 29/889.6 |
| 7,954,763 | B2 * | 6/2011 | Kulesha | B64C 3/187 244/123.4 |
| 8,347,579 | B2 * | 1/2013 | Gan | E04H 9/024 52/656.1 |
| 8,746,621 | B2 * | 6/2014 | Cabanac | B64C 1/26 244/119 |
| 8,857,765 | B2 * | 10/2014 | Thomas | B64C 1/26 244/119 |
| 9,475,570 | B2 * | 10/2016 | Charles | B64C 1/26 |
| 10,479,475 | B2 * | 11/2019 | Hasan | B64C 1/061 |
| 12,024,286 | B1 * | 7/2024 | Page | B64C 39/10 |
| 2008/0265094 | A1 * | 10/2008 | Van Der Veen | B64C 3/185 244/123.1 |
| 2008/0283666 | A1 * | 11/2008 | Grieve | B64C 1/26 244/131 |
| 2009/0136294 | A1 * | 5/2009 | Porter | B64C 1/06 403/408.1 |
| 2009/0321575 | A1 * | 12/2009 | Barroso Vloedgraven | B64C 1/26 244/131 |
| 2011/0278395 | A1 * | 11/2011 | Telgkamp | B64C 1/064 244/119 |
| 2011/0284693 | A1 * | 11/2011 | Barnard | B64C 1/064 428/192 |
| 2012/0001024 | A1 * | 1/2012 | Cruz Dominguez | B64C 1/1461 244/119 |
| 2012/0006940 | A1 * | 1/2012 | Mialhe | B64C 1/068 29/428 |
| 2012/0061512 | A1 * | 3/2012 | Stulc | B64C 1/1492 244/119 |
| 2012/0132748 | A1 * | 5/2012 | Axford | B64C 3/26 244/119 |
| 2012/0186062 | A1 * | 7/2012 | Vera Villares | B64C 1/069 29/428 |
| 2012/0292446 | A1 * | 11/2012 | Kamaraj | B29C 70/34 244/129.1 |
| 2013/0089712 | A1 * | 4/2013 | Kwon | B64C 1/12 428/174 |
| 2013/0101801 | A1 * | 4/2013 | Honorato Ruiz | B64C 1/064 428/167 |
| 2013/0112812 | A1 * | 5/2013 | Kismarton | B32B 25/02 428/521 |
| 2013/0337207 | A1 * | 12/2013 | Mueller | B29C 70/205 156/196 |
| 2015/0034765 | A1 * | 2/2015 | Gonzalez Gozalbo | B64C 1/0685 244/120 |
| 2015/0041589 | A1 * | 2/2015 | Hasan | B64C 1/26 244/119 |
| 2015/0225065 | A1 * | 8/2015 | Brunner | B64G 1/22 29/525.01 |
| 2016/0311512 | A1 * | 10/2016 | Sankrithi | B64C 1/061 |
| 2018/0334254 | A1 * | 11/2018 | Saint-Marc | B64D 11/003 |
| 2020/0269971 | A1 * | 8/2020 | Xi | B64U 30/12 |
| 2022/0001974 | A1 * | 1/2022 | Page | B64C 25/04 |
| 2022/0024556 | A1 * | 1/2022 | Heaysman | B64C 1/064 |
| 2022/0055735 | A1 * | 2/2022 | Campana | B64C 5/02 |
| 2022/0234716 | A1 * | 7/2022 | Young | B64C 1/10 |
| 2022/0274682 | A1 * | 9/2022 | Vukosav | B64C 1/18 |
| 2024/0253760 | A1 * | 8/2024 | Rawdon | B64C 39/10 |
| 2024/0317383 | A1 * | 9/2024 | Song | B64C 1/062 |
| 2024/0322542 | A1 * | 9/2024 | Mauger | B64F 5/10 |
| 2024/0336347 | A1 * | 10/2024 | Song | B64C 3/187 |
| 2024/0339711 | A1 * | 10/2024 | Song | B64C 1/062 |

FOREIGN PATENT DOCUMENTS

| | | |
|---|---|---|
| KR | 2001195290000 | 7/1998 |
| KR | 20-1998-0058538 U | 10/1998 |
| KR | 20140018313 A | 2/2014 |
| KR | 20160088251 A | 7/2016 |
| KR | 102153029 B1 | 9/2020 |

* cited by examiner

WING LOAD SUPPORT STRUCTURE OF THE FUSELAGE

CROSS-REFERENCE TO RELATED APPLICATION

This application claims under 35 U.S.C. § 119(a) the benefit of priority to Korean Patent Application No. 10-2023-0043911 filed on Apr. 4, 2023, the entire contents of which are incorporated herein by reference.

TECHNICAL FIELD

The present disclosure relates to a wing load support structure of a fuselage, and more specifically, to a wing load support structure of a fuselage capable of reducing a reduction in a head clearance with respect to an interior space of the fuselage and strengthening load support performance with respect to a wing unit.

BACKGROUND

Urban air mobility (UAM) an air traffic system that may reduce traffic congestion on roads. A UAM vehicle is a transportation capable of safely transporting occupants and/or cargo to a designated place. A UAM vehicle may not require a separate runway because it may be capable of a vertical take-off and landing. In addition, the UAM vehicle may be used at a lower cost than a helicopter because it may be capable of autonomous traveling.

Since occupants and/or cargo may be close to an inner surface of a fuselage of the UAM vehicle, a technology for securing stability in the event of a collision is important.

However, a conventional UAM vehicle has a problem of a collision load entering a space in which the occupants and/or cargo are present due to an impact applied to the fuselage (e.g., in the event of a large and/or high impact collision).

SUMMARY

The following summary presents a simplified summary of certain features. The summary is not an extensive overview and is not intended to identify key or critical elements.

Systems, apparatuses, and methods are described for a wing load support structure of a fuselage. A structure (e.g., the wing load support structure) may comprise a first joint mounted on a front spar of a wing unit of a fuselage; a center bulk head comprising a first spar joint configured to couple to the first joint and to support a vertical load of the front spar transmitted by the wing unit; a second joint mounted on a rear spar of the wing unit; a spar cover comprising a second spar joint, configured to couple to the second joint, connected to a rear bulk head via a bulk head upper support; and a support unit configured to support the spar cover and the rear bulk head inside the fuselage and configured to support a vertical load of the rear spar transmitted via the wing unit.

These and other features and advantages are described in greater detail below.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, examples of the present disclosure will be described in more detail with reference to the accompanying drawings. The examples of the present disclosure may be modified in various forms, and the scope of the present disclosure should not be construed as being limited to the following examples. The examples are provided to more completely describe the present disclosure to those skilled in the art.

The term "automobile" or "vehicle" or other similar term as used herein is inclusive of motor automobile in general such as passenger automobiles including sports utility automobile (operation SUV), buses, trucks, various commercial automobile, watercraft including a variety of boats and ships, aircraft, and the like, and includes hybrid automobile, electric automobile, plug-in hybrid electric automobile, hydrogen-powered automobile and other alternative fuel automobile (e.g., fuels derived from resources other than petroleum). As referred to herein, a hybrid automobile is an automobile that has two or more sources of power, for example both gasoline-powered and electric-powered automobile.

In addition, terms such as "part," "unit," and "member" described in the specification mean a unit that processes at least one function or operation, which may be implemented as software or hardware.

In addition, when a certain portion described in the specification is described as being "connected" to another, this includes not only a case in which the certain portion is directly connected thereto but also a case in which the certain portion is indirectly connected thereto, and the indirect connection includes connection via a wireless communication network.

In addition, "upper end" described in the specification means a direction moving to an upper end in a height direction on the drawing, and "lower end" means a direction moving to a lower end in the height direction on the drawing.

In addition, when a certain portion is described as being "on" or "above" another in the specification, this includes not only a case in which the certain portion is "directly on" another, but also a case in which other portions are present therebetween. In addition, when a certain portion is described as being "below" or "under" another in the specification, this includes not only a case in which the certain portion is "directly below" another, but also a case in which other portions are present therebetween.

In addition, in the specification, "height direction," "width direction," and "longitudinal direction" are based on a fuselage, such that a height direction is parallel from a bottom of the fuselage.

In addition, "fuselage" described in the specification may be of an urban air mobility (UAM) vehicle. A case in which a frontal collision occurs when the UAM crashes has been described as an example of an impact that may be experienced by the fuselage, but one skilled in the art would understood the present disclosure to apply in a case of a different type and/or direction of impact.

In addition, "center" described in the specification means a center in a width direction of the fuselage, and "side" means both ends in the width direction of the fuselage.

Figure 1:
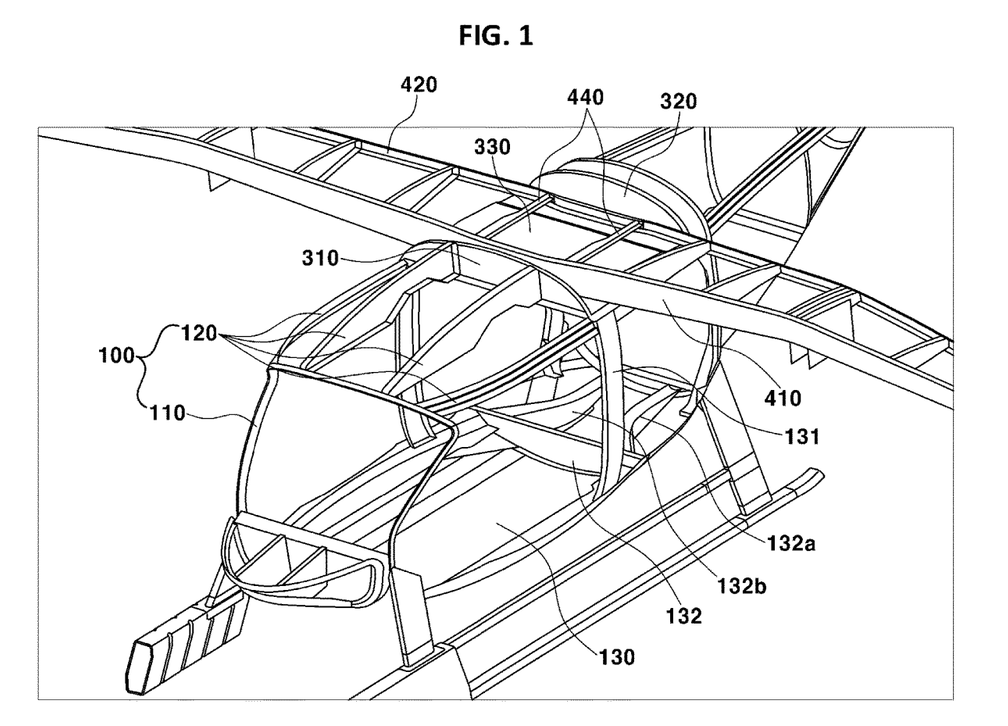
FIG. 1 is a view illustrating a structure of a collision load distribution structure of a fuselage according to an example of the present disclosure.
Figure 2:
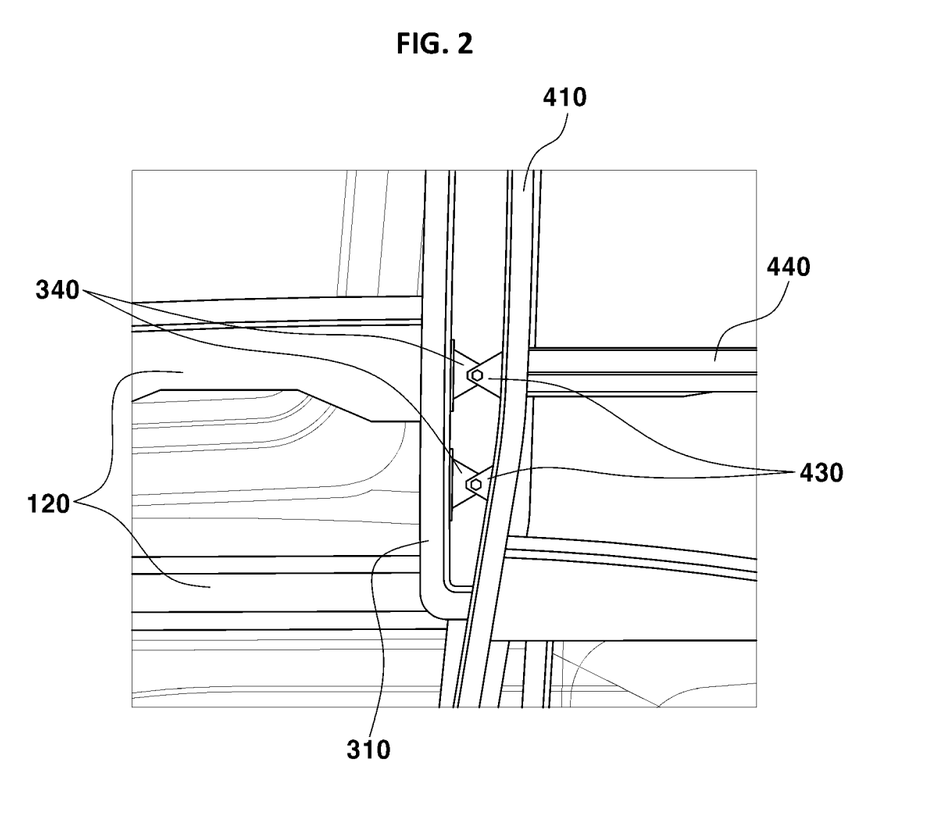
FIG. 2 is a view illustrating a fastening relationship between a support fitting member and a wing fitting member of the collision load distribution structure of the fuselage according to an example of the present disclosure.

FIG. 1 is a perspective view of a collision load distribution structure of a fuselage according to an example of the present disclosure, and FIG. 2 is a side perspective view of the collision load distribution structure of the fuselage according to an example of the present disclosure and illustrates the fastening relationship between a support fitting member and a wing fitting member.

The fuselage according to the example may include both vertical take-off and landing and aircraft capable of medium-distance flight and may be defined as an advanced air mobility (AAM) to include all of manned/unmanned airplanes, autonomous flight, and human-operated aircraft. Since the fuselage has a structure similar to that of a conventional aircraft, a collision load is generated in the same direction during vertical take-off and landing, take-off and landing using a runway, or the like, and thus collision energy needs to be absorbed at the front and rear of the fuselage, and it is important to reduce the occurrence of deformation of a boarding region (e.g., by absorbing the collision energy).

To this end, referring to FIGS. 1 and 2, the collision load distribution structure of the fuselage according to an example of the present disclosure may include a support unit 300 connected to a wing unit 400 between a front unit 100 and a rear unit 200 and may be configured to distribute a load applied to a fuselage to the wing unit 400 and the rear of the fuselage. More specifically, according to an example of the present disclosure, the collision load distribution structure of the fuselage may be configured so that a load in a longitudinal direction and a load in a height direction entering the fuselage are transmitted via a connection structure of the front unit 100 and the support unit 300, a connection structure of the support unit 300 and the rear unit 200, and a connection structure of the support unit 300 and the wing unit 400 to reduce the collision load entering a space in which occupants are positioned.

The front unit 100 may be positioned at a front end with respect to a wing of the fuselage. The front unit 100 may include a window frame 110 and a roof frame 120 on which a windshield glass is mounted. The roof frame 120 may be connected to a rear end of the window frame 110 and may extend in the longitudinal direction of the fuselage. The window frame 110 may be a frame surrounding a front windshield glass of the fuselage. The roof frame 120 may be configured to be fastened to an upper end of the window frame 110, and a plurality of roof frames 120 may be spaced apart from each other in the width direction of the window frame 110. In an example, as illustrated in FIG. 1, two roof frames 120 may be at the center and two roof frames 120 may be at sides in a width direction of the window frame 110, and the four roof frames 120 may be configured to have the same interval. The floor frame 130 may constitute a floor of the fuselage and may separate an inner space inside the front unit 100 and to be divided into a first row passenger space at the front side and a second row passenger space at the rear side. In an example, the floor frame 130 may be divided into the first row passenger space and the second row passenger space with a rear bulk head 132 as a boundary, and the rear bulk head 132 may include a pair of connection frames 132a and 132b to be connected to a second rear frame 220 to be described below.

The support unit 300 may be positioned between the front unit 100 and the rear unit 200. The roof frame 120 may be configured to be connected to the support unit 300. A rear end of the roof frame 120 may be configured to be connected to a front end of the support unit 300. The support unit 300 may be configured to be connected to the front unit 100 and the rear unit 200 to distribute a load applied to the front of the fuselage rearward. More specifically, the support unit 300 may be configured to include a first flange part 310, a second flange part 320, a plate part 330, and a support fitting member 340.

The support unit 300 may be configured so that the first flange part 310 and the second flange part 320 face each other with respect to the plate part 330. A space in which the first flange part 310 and the second flange part 320 face each other and are fastened may be included inside the support unit 300. The first flange part 310 may be connected to the rear end of the roof frame 120. The rear end of the roof frame 120 may be fastened to a front outer surface of the first flange part 310. The second flange part 320 may be connected to a front end of the rear unit 200. The front end of the rear unit 200 may be fastened to a rear outer surface of the second flange part 320.

The plate part 330 may be between the first flange part 310 and the second flange part 320. The plate part 330 may constitute a rear surface of a recessed region between the first flange part 310 and the second flange part 320 positioned on both side surfaces in a longitudinal direction. The plate part 330 may be in a plate shape and formed between lower ends of the first flange part 310 and the second flange part 320. The plate part 330 may be configured to be connected to a member forming an external skeleton of the fuselage to transmit loads in the longitudinal direction and height direction of the fuselage.

The support fitting member 340 may be provided on an inner surface of the first flange part 310 and/or an inner surface of the second flange part 320 (e.g., on surfaces facing each other). In an example, the support fitting member 340 is formed at an inner side of the first flange part 310 and fastened to a wing fitting member 430 at a position corresponding to one end of a wing frame part 440 (e.g., a rib) in the longitudinal direction. As illustrated in FIG. 2, to reinforce the connection structure between the first flange part 310 and a first skeleton part 410 needs, two support fitting members 340 may be provided on a left and/or right side of the inner surfaces of the first flange part 310 in the width direction. In addition, two support fitting members 340 may be provided on a left and/or right sides of the inner surface of the second flange part 320. One end of the support fitting member 340 may be configured at a position corresponding to each of the inner sides of the first flange part 310 and the second flange part 320. Coupling parts may be provided on the other ends of the first flange part 310 and/or the second flange part 320, corresponding to ends of the support fitting member 340 and fastened to the wing fitting member 430.

The wing unit 400 may be positioned inside the support unit 300. The wing unit 400 may be configured to be connected to the support unit 300 to distribute loads along the wing unit 400 when the fuselage collides. The wing unit 400 may be composed of the first skeleton part 410, a second skeleton part 420, the wing fitting member 430, the wing frame part 440, and a skin part 450. The first skeleton part 410 may be spaced at a predetermined interval from the inside of the first flange part 310 and formed to extend in the width direction of the fuselage. The second skeleton part 420 may be spaced at a predetermined interval from the inside of the second flange part 320 and formed to extend in the width direction of the fuselage. The first skeleton part 410 may constitute a transverse skeleton of the front end of the wing unit 400, and the second skeleton part 420 may constitute a transverse skeleton of the rear end of the wing unit 400.

The wing fitting member 430 may be provided at an outer side of the first skeleton part 410 and/or an outer side of the second skeleton part 420 (e.g., at positions corresponding to the support fitting member 340 in the longitudinal direction). The outer side of the first skeleton part 410 at which the wing fitting member 430 is positioned may refer to a side facing a direction in which the first skeleton part 410 faces the first flange part 310. The outer side of the second skeleton part 420 at which the wing fitting member 430 is positioned may refer to a side facing a direction of the second flange part 320.

The wing fitting member 430 may be configured to be connected to the support fitting member 340. In an example, two wing fitting members 430 may be provided on each of left and right sides of the outer surface of the first skeleton part 410 in the width direction. In addition, two support fitting members 430 may be provided on each of left and right sides of the outer surface of the second skeleton part 420 in the width direction. The wing fitting member 430 may have one end fixed to the outer sides of the first skeleton part 410 and the second skeleton part 420 and have a coupling part formed on the other end thereof. The coupling part of the support fitting member 340 and the coupling part of the wing fitting member 430 may be fastened, and the wing unit 400 may be fixed to the support unit 300.

The wing frame part 440 may be between the first skeleton part 410 and the second skeleton part 420. The wing fitting member 430 is configured at a position corresponding to one end of the wing frame part 440 in the longitudinal direction. As illustrated in FIG. 1, two wing frame parts 440 may be positioned between the first skeleton part 410 and the second skeleton part 420, above the plate part 330. The wing frame part 440 may be positioned between the first skeleton part 410 and the second skeleton part 420. The wing frame part 440 may be configured so that a load applied to the first skeleton part 410 and the second skeleton part 420 are transmitted to each other. As illustrated in FIG. 2, since the wing fitting member 430 and the support fitting member 340 may be fastened so that the wing frame part 440 is positioned collinearly with the facing roof frame 120, the loads applied to the first skeleton part 410 and the second skeleton part 420 may be transmitted to each other.

The skin part 450 may be configured to surround the outer sides of the first skeleton part 410 and the second skeleton part 420. The skin part 450 may be positioned in contact with upper surfaces of the first skeleton part 410 and the second skeleton part 420. As described above, the skin part 450 positioned in contact with the first skeleton part 410 and the second skeleton part 420 may be configured so that the loads transmitted to the first skeleton part 410 and the second skeleton part 420 are distributed in the longitudinal direction or width direction of the wing unit 400. The load of the fuselage in the longitudinal direction may be configured to be distributed to the wing unit 400 via the support unit 300 (e.g., from the front unit 100), or vice versa.

Figure 3:
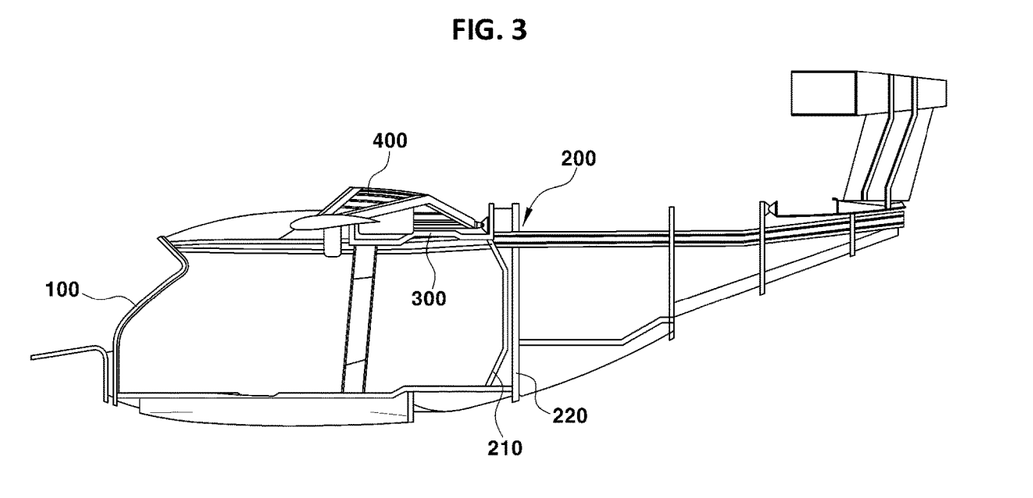
FIG. 3 is a view illustrating a rear unit of the collision load distribution structure of the fuselage according to an example of the present disclosure.
Figure 4:
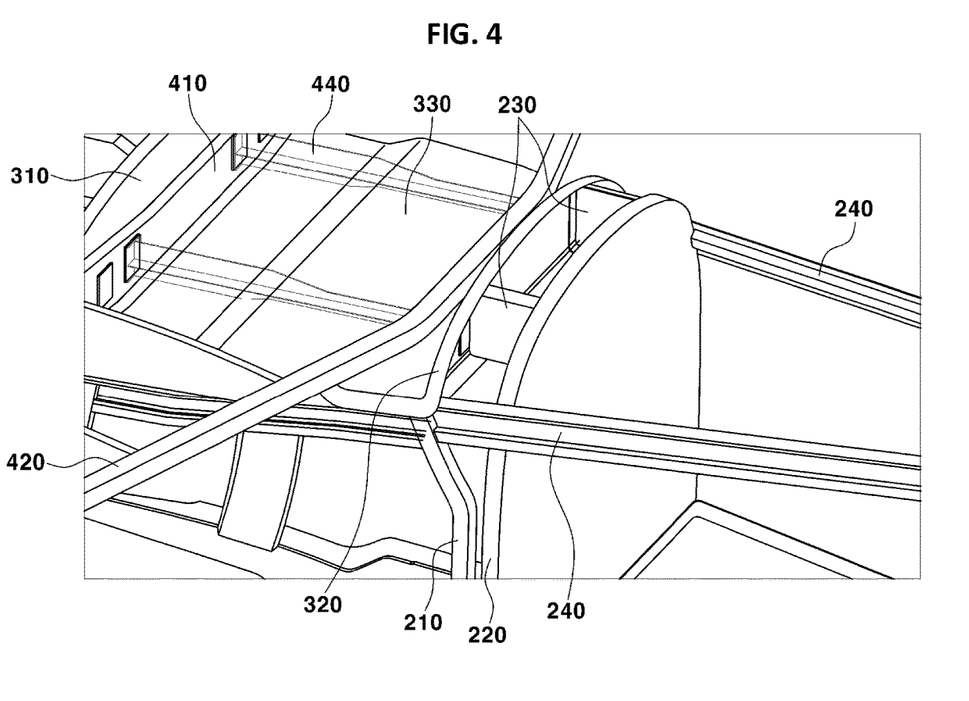
FIG. 4 is a view illustrating a connection relationship between a wing unit and the rear unit of the collision load distribution structure of the fuselage according to an example of the present disclosure.

FIG. 3 is a view illustrating a rear unit of the collision load distribution structure of the fuselage according to an example of the present disclosure, and FIG. 4 is a view illustrating a connection relationship between the wing unit 400 and the rear unit of the collision load distribution structure of the fuselage according to an example of the present disclosure.

Referring to FIGS. 3 and 4, the rear unit 200 may be positioned at a rear end with respect to the wing of the fuselage. The rear unit 200 may include a first rear frame 210, the second rear frame 220, a rear center frame 230, and a rear side frame 240. The first rear frame 210 may be configured to be connected to the plate part 330. The first rear frame 210 may extend in the height direction along the outer side of the fuselage and may be fastened (and/or fastenable) to a lower end of the second flange part 320 from the floor of the fuselage. In an example, an upper end of the first rear frame 210 may be positioned in contact with the lower end of the second flange part 320.

The second rear frame 220 may be located on a rear end of the first rear frame 210. The second rear frame 220 may have substantially a plate shape adjacent to the rear end of the first rear frame 210. The second rear frame 220 may be fastened to a pair of connection frames 132a and 132b connected to the rear bulk head 132 and the second rear frame 220 may be positioned to have a predetermined interval, more specifically, an interval corresponding to a length of the rear center frame 230 in FIG. 4 with respect to the upper end of the first rear frame 210, and thus configured so that the loads applied from the lower end of the fuselage is transmitted to the upper end of the fuselage in the height direction.

The rear center frame 230 may be positioned between the second flange part 320 and the second rear frame 220. The rear center frame 230 may be positioned in a space in which the second flange part 320 and the second rear frame 220 face each other. In an example, two rear center frames 230 may be provided at positions corresponding to the positions of the wing frame parts 440 in the longitudinal direction.

The rear side frame 240 may be positioned in contact with the first rear frame 210 and the second rear frame 220. The rear side frame 240 may be connected to the upper end of the first rear frame 210 and the upper end of the second rear frame 220. The rear side frame 240 may extend rearward in the longitudinal direction of the fuselage. One end of the rear side frame 240 may be connected to the first rear frame and the other end thereof may extend to the rear of the fuselage.

Figure 5:
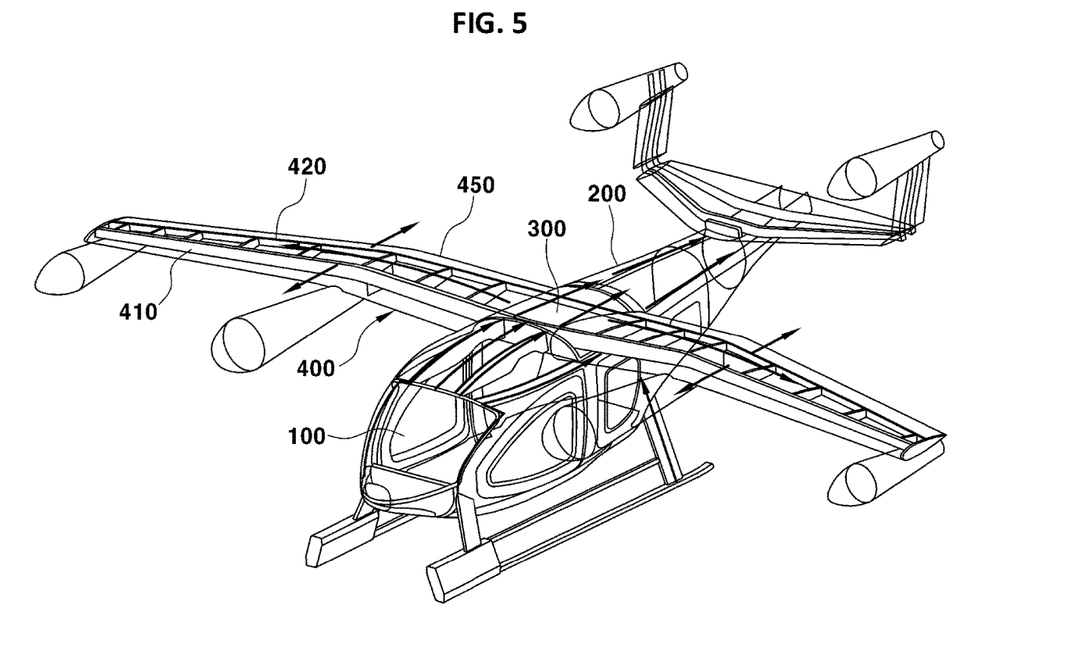
FIG. 5 is a view illustrating that a load in a longitudinal direction and a load in a height direction in the collision load distribution structure of the fuselage according to an example of the present disclosure are distributed to the wing unit and the rear of the fuselage.

FIG. 5 is a view illustrating that a load in a longitudinal direction and a load in a height direction in the collision load distribution structure of the fuselage according to an example of the present disclosure are distributed to the wing unit 400 and the rear of the fuselage.

Referring to FIG. 5, a load on the fuselage in the longitudinal direction may be transmitted to the first flange part 310 via the window frame 110 and the roof frame 120 and transmitted to the first skeleton part 410 from the support fitting member 340 and/or the wing fitting member 430. The load may be distributed via the skin part 450. In addition, the load transmitted to the first skeleton part 410 may be transmitted to the second skeleton part 420 via the wing frame part 440 and distributed via the skin part 450.

In an example, when the fuselage crashes and/or a collision load is applied at a given angle (e.g., with respect to the front end of the fuselage, the load in the longitudinal direction may enter the window frame 110 and may be transmitted to the front end of the roof frame 120 connected to the rear end of the window frame 110. The load transmitted to the rear end of the roof frame 120 may be transmitted to the first flange part 310 and subsequently transferred to the support fitting member 340 and the wing fitting member 430. The loads transmitted to the support fitting member 340 and the wing fitting member 430 may be transmitted to the first skeleton part 410 and distributed in the longitudinal direction of the first skeleton part 410. The load distributed in the longitudinal direction of the first skeleton part 410 may also, or alternatively, be distributed in the longitudinal direction of the fuselage via the skin part 450. The load transmitted to the first skeleton part 410 may be transmitted to the second skeleton part 420 via the wing frame part 440 and distributed in the longitudinal direction of the second skeleton part 420. The load distributed in the longitudinal direction of the second skeleton part 420 may also, or alternatively, be distributed in the longitudinal direction of the fuselage via the skin part 450.

The load of the fuselage in the height direction may be configured to be transmitted to the second flange part 320 via the first rear frame 210, transmitted to the rear side frame 240 and the rear center frame 230 of the rear unit 200 via the second rear frame 220, subsequently transmitted to the second skeleton part 420 after passing the support fitting member 340 and the wing fitting member 430, and distributed via the skin part 450. In addition, the load transmitted to the second skeleton part 420 may be configured to be transmitted to the first skeleton part 410 via the wing frame part 440 and distributed via the entire region of the fuselage.

In an example, when a collision load of the fuselage in the height direction is applied, the load in the height direction transmitted to the fuselage may enter the lower end of the first rear frame 210 and may be transmitted to the second flange part 320 connected to the upper end of the first rear frame 210. A part of the load in the height direction applied to the fuselage may enter the lower end of the second rear frame 220 and may be transmitted to the rear side frame 240 connected to the upper end of the second rear frame 220. The collision load applied to the second rear frame 220 may be transmitted to the second flange part 320 and transmitted to the wing fitting member 430 via the support fitting member 340 fastened to the second flange part 320. The loads transmitted to the support fitting member 340 and the wing fitting member 430 may be transmitted to the second skeleton part 420 and distributed in the longitudinal direction of the second skeleton part 420. The load distributed in the longitudinal direction of the second skeleton part 420 may also, or alternatively, be distributed in the longitudinal direction of the fuselage via the skin part 450. In addition, the load transmitted to the second skeleton part 420 may be transmitted to the first skeleton part 410 via the wing frame part 440 and distributed in the longitudinal direction of the first skeleton part 410. The load distributed in the longitudinal direction of the first skeleton part 410 may also, or alternatively, be distributed in the longitudinal direction of the fuselage via the skin part 450. Therefore, the load of the fuselage in the height direction may be distributed to the wing unit 400 via the support unit 300 (e.g., from the rear unit 200).

Figure 6:
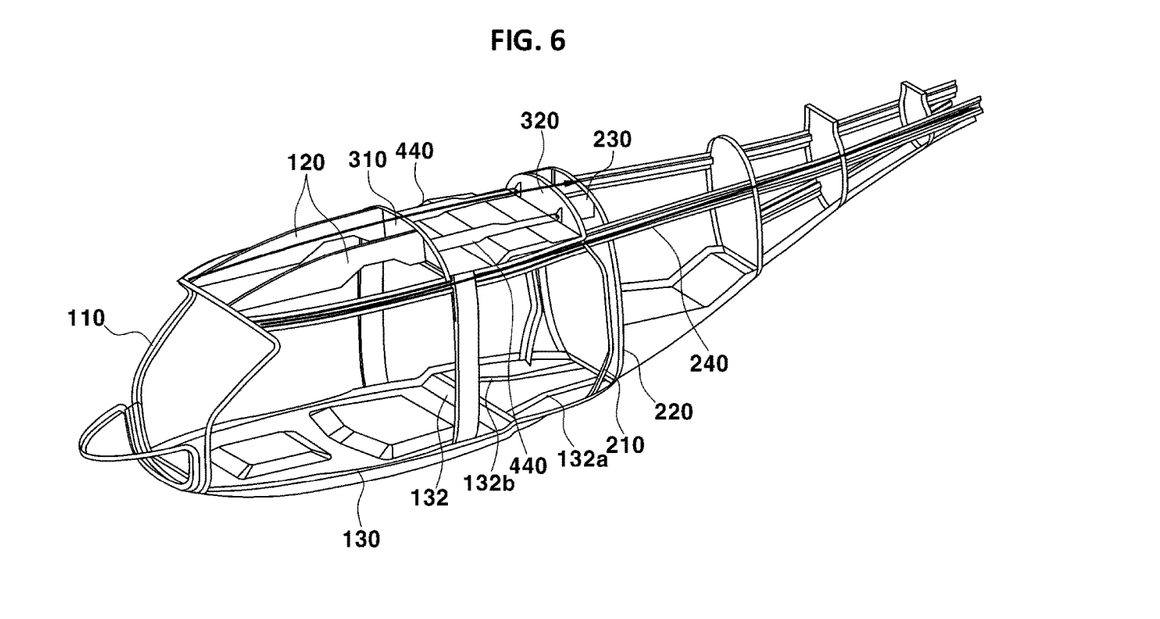
FIG. 6 is a view illustrating transmission of a center load and a side load in the longitudinal direction in the collision load distribution structure of the fuselage according to an example of the present disclosure.

FIG. 6 is a view illustrating transmission of a center load and a side load in the longitudinal direction in the collision load distribution structure of the fuselage, according to an example of the present disclosure.

Referring to FIG. 6, a load applied in the longitudinal direction of the fuselage may be transmitted from the roof frame 120 to the wing frame part 440 via the first flange part 310 and/or transmitted from the wing frame part 440 to the rear center frame 230 via the second flange part 320. Also, or alternatively, a side load applied to the fuselage in the longitudinal direction may be transmitted from either (e.g., both) ends of the front side of the roof frame 120 to the rear side frame 240 after passing the first rear frame 210 along the side surface of the plate part 330.

The load applied in the longitudinal direction of the fuselage may be transmitted from the front end to the rear end of the roof frame 120 and transmitted to the support fitting member 340 and the wing fitting member 430 adjacent to the first flange part 310 via the first flange part 310. The loads transmitted to the support fitting member 340 and the wing fitting member 430 adjacent to the first flange part 310 may be transmitted to the wing frame part 440 and to the support fitting member 340 and the wing fitting member 430 adjacent to the second flange part 320. The loads transmitted to the support fitting member 340 and the wing fitting member 430 adjacent to the second flange part 320 may be transmitted to the second flange part 320 and to the rear center frame 230.

In addition, a load transmitted to a side surface of the fuselage in the longitudinal direction may be transmitted from the front end to the rear end of the fuselage along both ends of the roof frame 120 and transmitted to a rear surface of the fuselage in the longitudinal direction of the plate part 330. The load transmitted to a rear end of the plate part 330 may be transmitted to the rear side frame 240 after passing the first rear frame 210.

In summary, the present disclosure provides the collision load distribution structure, which may transmit and distribute the crash load entering the fuselage to the wing unit 400 and the rear of the fuselage by applying the support unit 300 to reduce the collision load entering the space in which the passenger is positioned, thereby securing stability.

Figure 7:
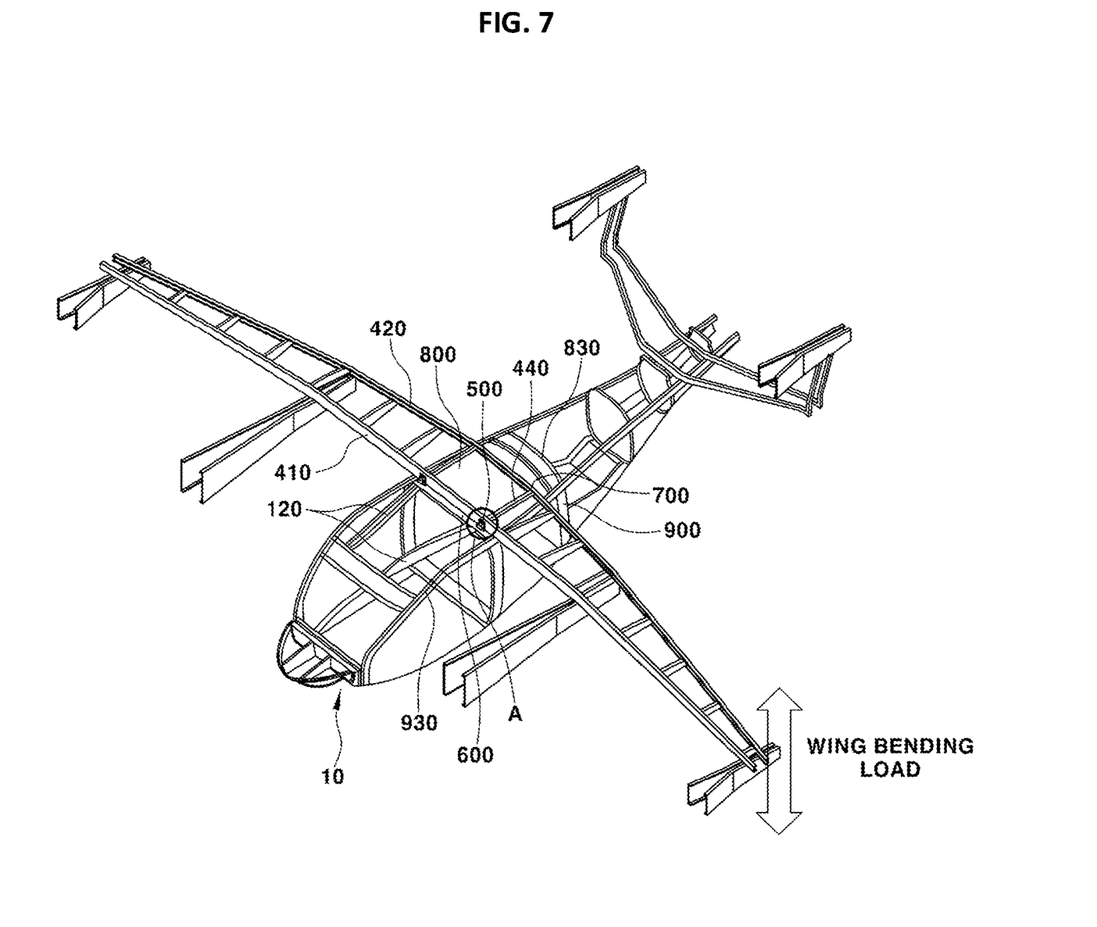
FIG. 7 is a view illustrating a wing load support structure of a fuselage according to another example of the present disclosure.
Figure 8A:
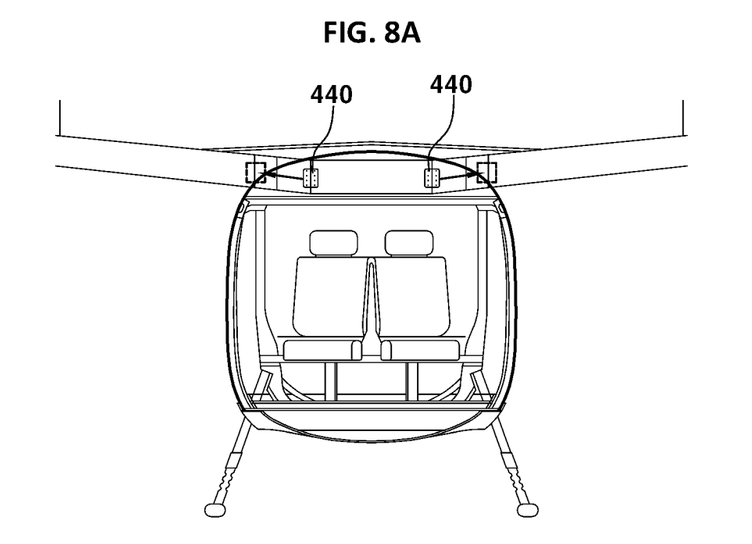
FIGS. 8A and 8B are views illustrating a head clearance of the fuselage with respect to the wing load support structure of the fuselage according to another example of the present disclosure.
Figure 8B:
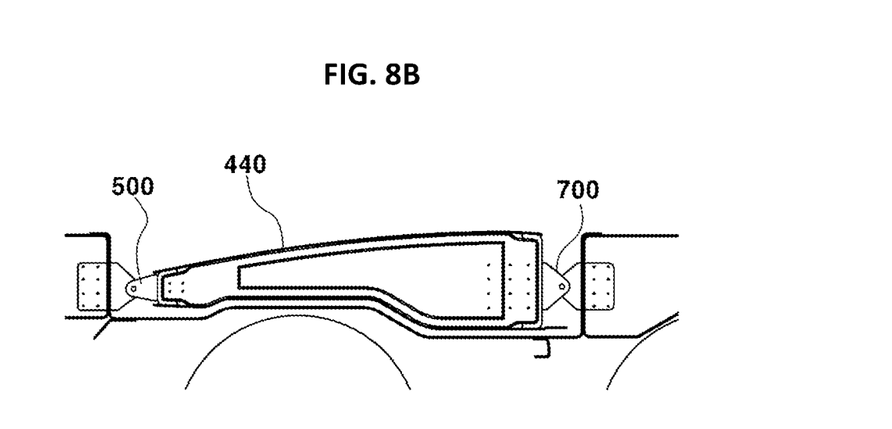

Hereinafter, FIG. 7 is a view illustrating a wing load support structure of a fuselage according to another example of the present disclosure, and FIGS. 8A and 8B are views illustrating a head clearance of the fuselage with respect to the wing load support structure of the fuselage according to another example of the present disclosure.

Figure 9:
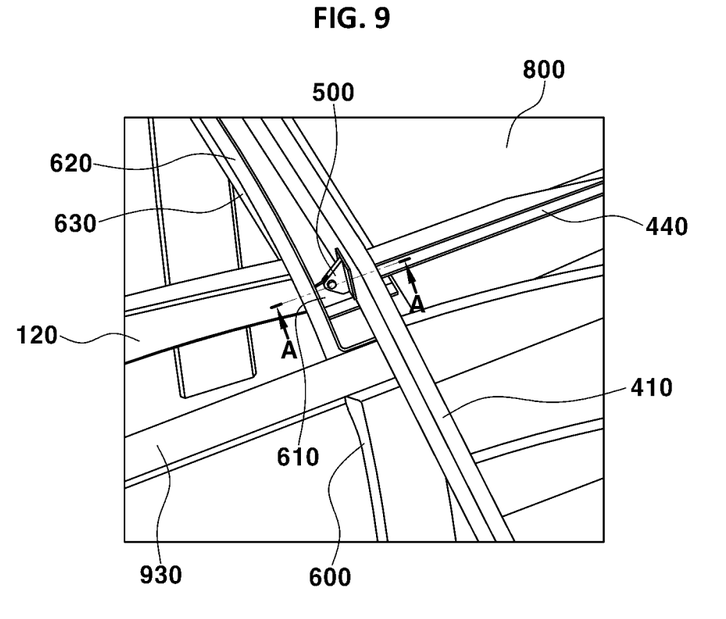
FIG. 9 is a view illustrating region A of FIG. 7 illustrating a load support of a front spar of the wing load support structure of the fuselage according to another example of the present disclosure.
Figure 10:
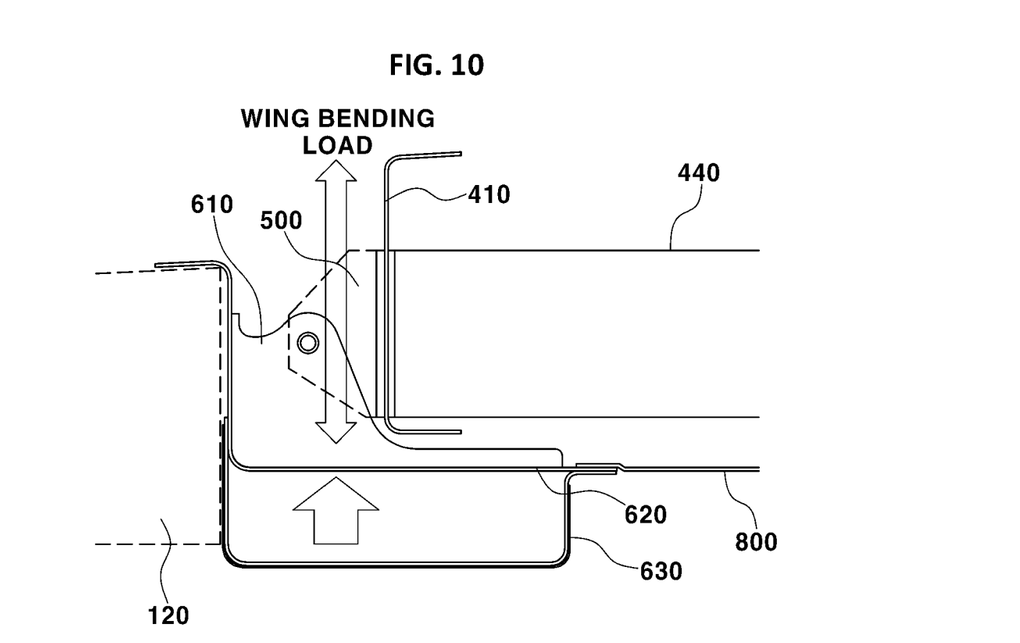
FIG. 10 is a cross-sectional view taken line A-A of FIG. 9 of the wing load support structure of the fuselage according to another example of the present disclosure.
Figure 11:
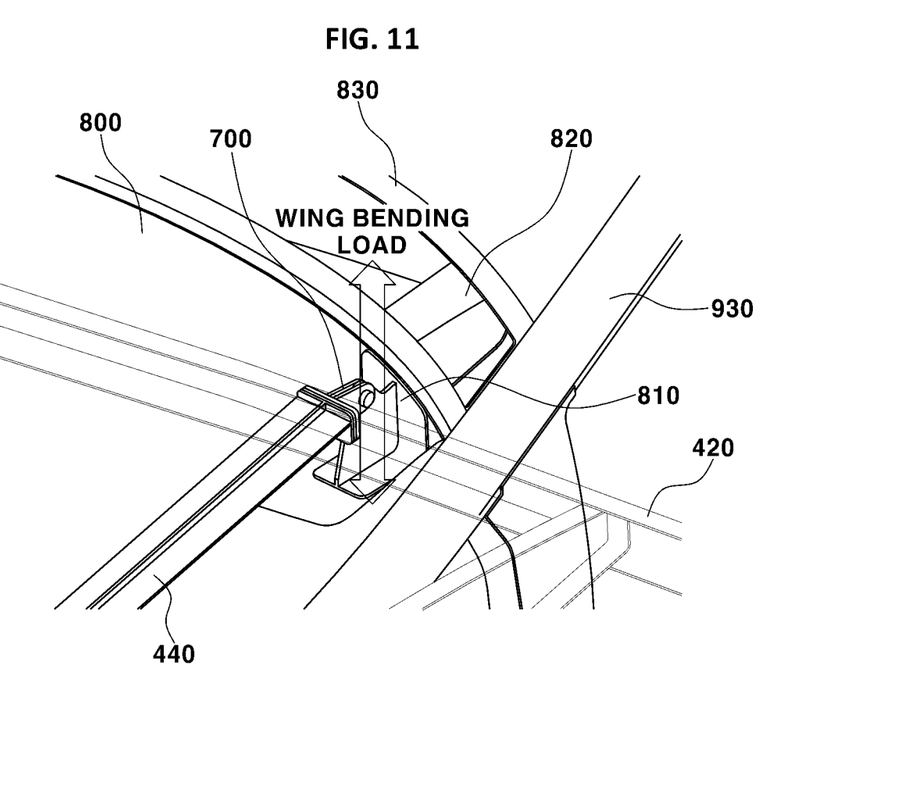
FIG. 11 is a view illustrating a load support of a rear spar of the wing load support structure of the fuselage according to another example of the present disclosure.

In addition, FIG. 9 is a view illustrating region A of FIG. 7 illustrating a load support of a front spar of the wing load support structure of the fuselage according to another example of the present disclosure, FIG. 10 is a cross-sectional view taken line A-A of FIG. 9 of the wing load support structure of the fuselage according to another example of the present disclosure, and FIG. 11 is a view illustrating a load support of a rear spar of the wing load support structure of the fuselage according to another example of the present disclosure.

Figure 12:
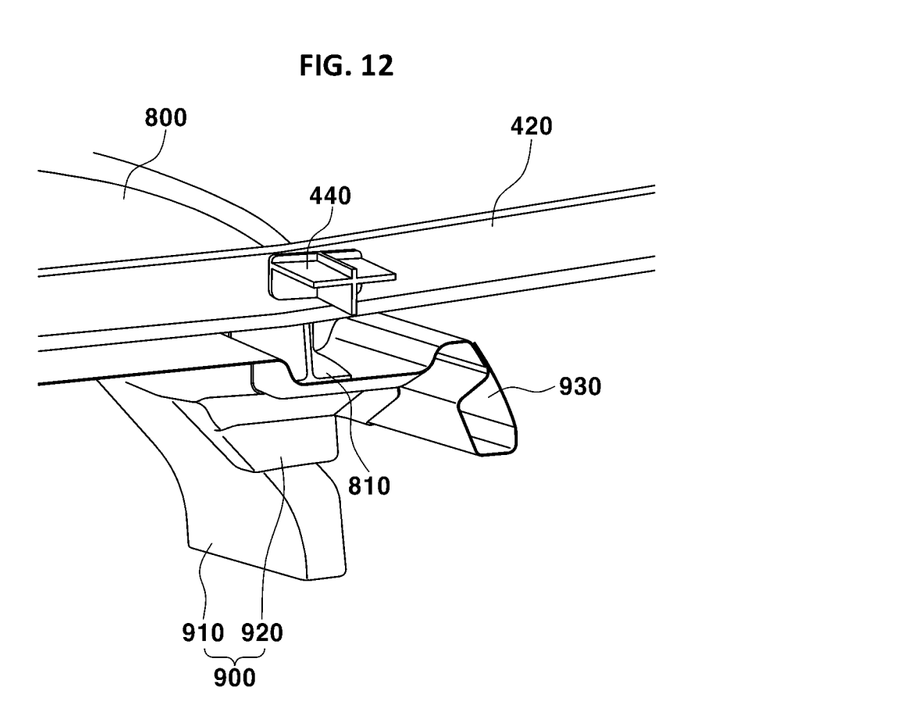
FIG. 12 is a view illustrating a support unit of the wing load support structure of the fuselage according to another example of the present disclosure.
Figure 13:
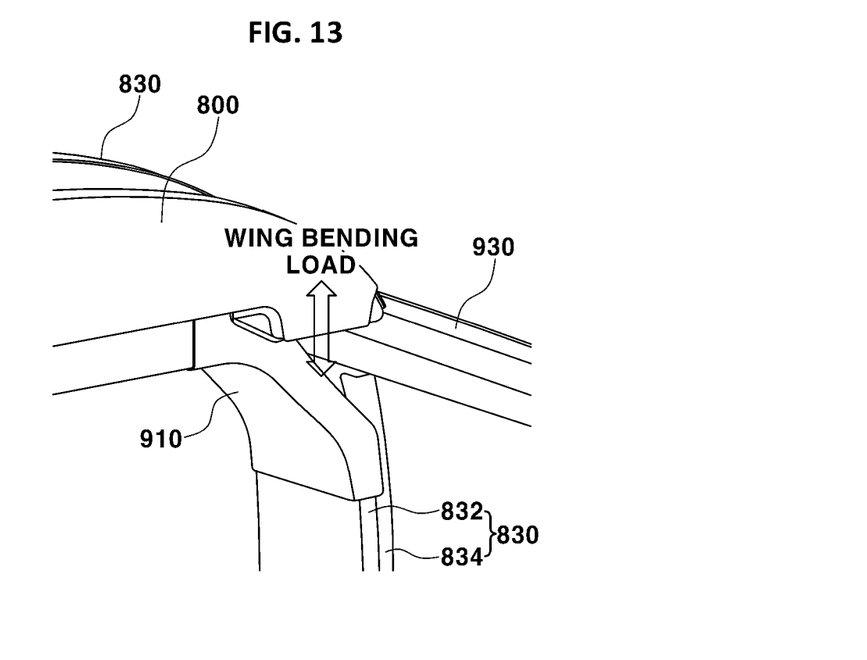
FIG. 13 is a view illustrating a structure of a rear bulk head of the wing load support structure of the fuselage according to another example of the present disclosure.

In addition, FIG. 12 is a view illustrating a support unit of the wing load support structure of the fuselage according to another example of the present disclosure, and FIG. 13 is a view illustrating a structure of a rear bulk head of the wing load support structure of the fuselage according to another example of the present disclosure.

If a bending load is applied to a wing of a fuselage 10 (e.g., if a force configured to bend the wing in a bow shape is generated), it may be beneficial to reinforce the coupling structure of the first skeleton part 410 and the second skeleton part 420 corresponding to the front spar and the rear spar of the wing unit in order to support such a load.

If only the structural reinforcement for the wing frame part 440 of the fuselage 10 is made, it may be difficult to secure a clearance (e.g., a head clearance for a boarding space inside the fuselage 10). This may eventually cause an insufficient boarding and/or cargo space as illustrated in FIG. 8B.

Therefore, as illustrated in FIG. 8A, it is important to structurally reinforce the load support due to the generation of the bending load on the wing unit by arranging the position of the wing frame part 440 to (e.g., move to) both corners of the fuselage 10. Arranging the position of the wing frame part 440 out in the width direction may reduce and/or minimize the reduction in the head clearance for the boarding space and/or reinforce the coupling structure of the fuselage 10 with the wing unit.

As illustrated in FIG. 7, the wing load support structure of the fuselage according to the example includes a first joint 500, a center bulk head 600, a second joint 700, a spar cover 800, and a support unit 900.

The first joint 500 may be mounted on the first skeleton part 410 corresponding to the front spar constituting the wing unit of the fuselage 10.

Multiple first joints 500 may be coupled to each other, between the wing frame part 440 (e.g., a rib of the wing frame, i.e., a wing frame rib) and the first skeleton part 410. The first joints 500 may be disposed collinearly with the second joints 700, as the first skeleton part 410 and the second skeleton part 420 are connected via the wing frame part 440.

A pair of wing frame parts 440 (e.g., ribs of the wing frame, i.e., wing frame ribs) may be provided above (e.g., towards a top of) the fuselage 10. Compared to FIG. 1, and the like, each of the pair of wing frame parts 440 is disposed to be relatively tilted (e.g., positioned) to outer upper corners with respect to the upper center of the fuselage 10 (see, e.g., FIG. 7).

Positioning and/or moving the pair of wing frame parts 440 to the up and out from an upper center of the fuselage may reduce a reduction in the head clearance for the boarding space (e.g., for minimizing an interference with a position of the passenger's head).

As illustrated in FIG. 10, the first joint 500 is axially connected to the first spar joint 610 and oriented to vertically move (e.g., flex, rotate, bend, etc.).

Since the first joint 500 is axially connected to the first spar joint 610 fixed to the center bulk head 600, the first joint 500 vertically moves along the axis together with the second joint 700 when the bending load on the extendable wing unit (e.g., extending to a side of the fuselage with a length) is generated, thereby achieving the load support.

As illustrated in FIG. 9, the center bulk head 600 may include the first spar joint 610 to be coupled to the first joint 500. The center bulk head may support the vertical load of the first skeleton part 410.

As illustrated in FIG. 10, the center bulk head 600 includes an upper bulk head 620 and a lower bulk head 630.

Referring back to FIG. 5, the load of the fuselage 10 in the longitudinal direction may be transmitted to the upper portion of the fuselage 10 (e.g., via the window frame 110 and the roof frame 120). A load from the upper portion of the fuselage 10 may be transmitted to the first skeleton part 410 from the first spar joint 610 and the first joint 500. The load may be distributed via the skin part 450. The load transmitted to the first skeleton part 410 may also be transmitted to the second skeleton part 420 via the wing frame part 440 and/or distributed via the skin part 450.

To reinforce the center bulk head 600 (e.g., in order to support and/or distribute a load of the fuselage 10 in the longitudinal direction and distribute the load), the upper bulk head 620 and/or the lower bulk head 630 may be included to structurally support the load on the first skeleton part 410 transmitted from the first spar joint 610.

To this end, the first spar joint 610 may be mounted on an upper surface of the upper bulk head 620. As illustrated in FIG. 10, one end of the upper bulk head 620 may couple to the roof frame 120. For example, the one end of the upper bulk head 620 may overlap and/or surround a kill beam constituting the roof frame of the fuselage 10. Another end of the upper bulk head 620 may couple to and/or overlap a front of a spar cover 800.

Through such a structure, the first spar joint 610 may be reliably fixed, which may achieve a vertical load support for the moving first joint 500.

The lower bulk head 630 may be provided in a "U" shape. The lower bulk head 630 may form an inner region with the upper bulk head 620, and may be coupled to the upper bulk head 620.

As illustrated in FIG. 10, the lower bulk head 630 may have one end coupled between the roof frame 120 corresponding to the kill beam and the upper bulk head 620. The lower bulk head 630 may have the other end coupled to and/or to overlap the other end of the upper bulk head 620 and a front of the spar cover 800.

As described above, since the lower bulk head 630 forms the inner region by its shape and by coupling to the upper bulk head 620, the lower bulk head 630 may support the load in an arrow direction in FIG. 10.

In the disclosed structure, the wing frame part 440 is disposed to be tilted to a corner of the upper portion of the fuselage 10 (out and up) and the kill beam (e.g., the roof frame 120) is also disposed to be tilted to the side of the fuselage so as to transmit the load of the fuselage 10 in the longitudinal direction. By supporting the loads acting on the first spar joint 610 and the first joint 500 disposed to move to both corners of the upper portion of the fuselage 10 via the coupling of the roof frame 120, the upper bulk head 620, and the lower bulk head 630, it is possible to effectively support the bending load acting on the connection region of the first skeleton part 410.

The second joint 700 is mounted on the second skeleton part 420 corresponding to the rear spar constituting the wing unit.

Here, the second joints 700 are coupled to face each other between the wing frame part 440 and the second skeleton part 420, and the first skeleton part 410 and the second skeleton part 420 are connected via the wing frame part 440 and thus disposed collinearly with the first joint 500.

As illustrated in FIG. 11, the second joint 700 is axially connected to a second spar joint 810 and oriented to vertically move.

That is, since the second joint 700 is axially connected to the first spar joint 610 fixedly mounted on the spar cover 800. The second joint 700 vertically moves along the axis together with the first joint 500 when the bending load on the extendable wing unit (e.g., extending to a side of the fuselage with a length) is generated, thereby achieving the load support.

The spar cover 800 may include the second spar joint 810, which may be configured to be coupled to the second joint 700 and may be connected to the rear bulk head 830 by a bulk head upper support 820.

The spar cover 800 may have a shape such that a rear portion is bent, a front portion coupled to overlap the other ends of the upper bulk head 620 and the lower bulk head 630, and comprising the second spar joint 810 at the rear portion. The shape of the spar cover 800 may enable the second spar joint 810 and the second joint 700 to be axially connected.

The second joint 700 being axially connected to the fixed second spar joint 810 may result in the second joint 700 vertically moving along the axis together with the first joint 500 when the bending load on the extendable wing unit is generated, thereby achieving the load support.

Here, since the rear portion of the spar cover 800 is connected to the rear bulk head 830 by the bulk head upper support 820, the spar cover 800 has a structure in which the above three members are integrally coupled, thereby achieving the load support on the wing unit.

As illustrated in FIG. 13, the rear bulk head 830 may have a double structure in which each of side surfaces comprises an inner bulk head 832 and an outer bulk head 834 for the load support. Also, or alternatively, the rear bulk head 830 may include a joint bulk head 910 to connect an upper surface and the side surfaces of the rear bulk head 830, thereby achieving structural reinforcement.

That is, the support unit 900 may be configured to support the spar cover 800 and the rear bulk head 830 together inside the fuselage 10 and support the vertical load of the second skeleton part 420 transmitted by the wing unit. To this end, the support unit 900 may include the joint bulk head 910 and a support member 920.

As described above, the joint bulk head 910 may be coupled to the rear bulk head 830, and as illustrated in FIG. 12, the support member 920 may be coupled to the joint bulk head 910 to extend to the spar cover 800. The support member 920 may be coupled to support the joint bulk head 910 and the spar cover 800 together.

More specifically, the support member 920 may be coupled to a side surface of the joint bulk head 910. The support member 920 may extend to the front of the fuselage 10 (see FIG. 13). As illustrated in FIG. 12, a region extending forward may be coupled to support a lower portion of the spar cover 800 to additionally connect the spar cover 800 and the rear bulk head 830 inside the fuselage 10 together with the bulk head upper support 820.

The support member 920 being coupled to a longeron 930 (which may extend in the longitudinal direction of the fuselage 10 so that an outer side is part of the skeleton of the fuselage 10) as described above may more effectively achieve the load support.

Therefore, it is possible to achieve the load support on the second skeleton part 420 vertically acting (e.g., as indicated by the arrow in FIG. 11) via the axial connection structure of the second joint 700 and the second spar joint 810, and by additionally mounting the joint bulk head 910 and the support member 920, it is possible to effectively support the bending load acting on the connection region of the second skeleton part 420 inside the fuselage 10 (e.g., the connection region disposed to move from an upper center of the fuselage 10 further up and/or further out from a center of the fuselage).

One or more aspects of the present disclosure described herein is directed a wing load support structure of a fuselage, which supports a load of a front spar constituting a front end of a wing unit by transmitting a load to a first joint and a first spar joint on a front portion of the wing unit having a male and female structure when a load occurs due to shaking of the wing unit and structurally reinforces a center bulk head for supporting a second part joint and at the same time, support a load of a rear spar constituting a rear end of the wing unit by mounting the support unit to implement the structural reinforcement in transmitting the load to a second joint and the second spar joint on a rear portion of the wing unit.

A wing load support structure of a fuselage according to the present disclosure includes a first joint mounted on a front spar constituting a wing unit of the fuselage, a center bulk head including a first spar joint to be coupled to the first joint and formed to support a vertical load of the front spar transmitted by the wing unit, a second joint mounted on a rear spar constituting the wing unit, a spar cover including a second spar joint to be coupled to the second joint and connected to a rear bulk head by a bulk head upper support, and a support unit configured to support the spar cover and the rear bulk head inside the fuselage and formed to support a vertical load of the rear spar transmitted by the wing unit.

Here, the first joint and the second joint may be collinearly disposed as the front spar and the rear spar are connected via a wing frame part.

A pair of wing frame parts may be provided and disposed to be respectively tilted to both corners with respect to an upper center of the fuselage.

In addition, the first joint may be axially connected to the first spar joint to vertically move.

In addition, the second joint may be axially connected to the second spar joint to vertically move.

In addition, the center bulk head may include an upper bulk head configured to support the first spar joint, and a lower bulk head coupled to form an inner region under the upper bulk head and configured to support the upper bulk head.

Here, the upper bulk head may have one end bent to surround a kill beam constituting a roof frame of the fuselage and the other end coupled to overlap a front portion of the spar cover.

In addition, the lower bulk head may be provided in a "U" shape to form the inner region, and may have one end coupled between the kill beam and the upper bulk head and the other end coupled to overlap the upper bulk head and the front portion of the spar cover.

The support unit may include a joint bulk head connecting an upper surface and a side surface of the rear bulk head, and a support member coupled to the joint bulk head to extend to the spar cover, and configured to support the joint bulk head and the spar cover together.

The support member may be coupled to a longeron forming the skeleton of the fuselage.

The rear bulk head may have a double structure in which the side surface to be coupled to the joint bulk head is composed of an inner bulk head and an outer bulk head.

According to the present disclosure, it is possible to support the load of the front spar constituting the front end of the wing unit by transmitting the load to the first joint and the first spar joint on the front portion of the wing unit having the male and female structure when the load occurs due to shaking of the wing unit and structurally reinforces a center bulk head for supporting the second part joint and at the same time, support the load of the rear spar constituting the rear end of the wing unit by mounting the support unit to implement the structural reinforcement in transmitting the load to the second joint and the second spar joint on the rear portion of the wing unit.

According to the present disclosure, by arranging the structure of the first joint and the first spar joint on the front portion of the wing unit and the structure of the second joint and the second spar joint on the rear portion of the wing unit to be tilted to both corners with respect to the center of the upper portion of the fuselage, it is possible to secure the head clearance with respect to the occupants.

According to the present disclosure, it is possible to support the load of the front spar constituting the front end of the wing unit by transmitting the load to the first joint and the first spar joint on the front portion of the wing unit having the male and female structure when the load occurs due to shaking of the wing unit (e.g., vertical vibrations and/or load) and structurally reinforces a center bulk head for supporting the second part joint. The disclosed structure also allows for supporting the load of the rear spar constituting the rear end of the wing unit by mounting the support unit to implement the structural reinforcement in transmitting the load to the second joint and the second spar joint on the rear portion of the wing unit.

According to the present disclosure, by arranging the structure of the first joint and the first spar joint on the front portion of the wing unit and the structure of the second joint and the second spar joint on the rear portion of the wing unit to be tilted to both corners with respect to the center of the upper portion of the fuselage, it is possible to secure the head clearance with respect to the occupants.

The present disclosure has been described above with reference to the example(s) shown in the drawings, but it will be understood that this is only illustrative, and various modifications can be made from the present disclosure by those skilled in the art, and all or some of the above-described example(s) may also be configured in selective combination thereof. Therefore, the true technical scope of the present disclosure should be determined by the technical spirit of the appended claims.

What is claimed is:

1. A wing load support structure of a fuselage, comprising:
    a first joint mounted on a front spar of a wing unit of the fuselage;
    a center bulk head comprising a first spar joint configured to couple to the first joint and to support a vertical load of the front spar transmitted by the wing unit;
    a second joint mounted on a rear spar of the wing unit;
    a spar cover comprising a second spar joint, configured to couple to the second joint, connected to a rear bulk head via a bulk head upper support; and
    a support unit configured to support the spar cover and the rear bulk head inside the fuselage and configured to support a vertical load of the rear spar transmitted via the wing unit,
    wherein the center bulk head comprises:
        an upper bulk head configured to support the first spar joint; and
        a lower bulk head coupled to the upper bulk head such that an inner region is formed between the upper bulk head and the lower bulk head supporting the upper bulk head.

2. The wing load support structure according to claim 1, wherein the first joint and the second joint are collinearly disposed via a wing frame rib connecting the front spar and the rear spar.

3. The wing load support structure according to claim 2, wherein a pair of wing frame ribs is provided and respectively tilted to away from a center of the spar cover of the fuselage.

4. The wing load support structure according to claim 1, wherein the first joint is axially connected to the first spar joint and oriented to vertically move with vertical movement of the first spar.

5. The wing load support structure according to claim 1, wherein the second joint is axially connected to the second spar joint and oriented to vertically move with vertical movement of the second spar.

6. The wing load support structure according to claim 1, wherein the upper bulk head comprises:
    a first end bent to a shape configured to surround a kill beam of a roof frame of the fuselage, and
    a second end coupled to, and overlapping with, a front portion of the spar cover.

7. The wing load support structure according to claim 6, wherein the lower bulk head comprises:
    a portion, with a "U" shape cross-section, that forms the inner region with the upper bulk head,
    a first end coupled between the kill beam and the upper bulk head, and
    a second end coupled to overlap the upper bulk head and the front portion of the spar cover.

8. The wing load support structure according to claim 1, wherein the support unit comprises:
    a joint bulk head connecting an upper surface and a side surface of the rear bulk head; and
    a support member coupled to the joint bulk head so as to extend to the spar cover, and configured to support the joint bulk head and the spar cover together.

9. The wing load support structure according to claim 8, wherein the support member is coupled to a longeron that forms a part of a skeleton of the fuselage.

10. The wing load support structure according to claim 8, wherein the rear bulk head comprises a double structure in which the side surface coupled to the joint bulk head comprises an inner bulk head and an outer bulk head.

11. A vehicle comprising:
a fuselage comprising a wing unit and the wing load support structure according to claim 1.

12. A wing load support structure of a fuselage, comprising:
a first joint mounted on a front spar of a wing unit of the fuselage;
a center bulk head comprising a first spar joint configured to couple to the first joint and to support a vertical load of the front spar transmitted by the wing unit;
a second joint mounted on a rear spar of the wing unit;
a spar cover comprising a second spar joint, configured to couple to the second joint, connected to a rear bulk head via a bulk head upper support; and
a support unit configured to support the spar cover and the rear bulk head inside the fuselage and configured to support a vertical load of the rear spar transmitted via the wing unit, wherein the support unit comprises:
a joint bulk head connecting an upper surface and a side surface of the rear bulk head; and
a support member coupled to the joint bulk head so as to extend to the spar cover, and configured to support the joint bulk head and the spar cover together.

13. The wing load support structure according to claim 12, wherein the support member is coupled to a longeron that forms a part of a skeleton of the fuselage.

14. The wing load support structure according to claim 12, wherein the rear bulk head comprises a double structure in which the side surface coupled to the joint bulk head comprises an inner bulk head and an outer bulk head.

15. The wing load support structure according to claim 12, wherein the center bulk head comprises an upper bulk head configured to support the first spar joint, and
wherein the upper bulk head comprises:
a first end bent to a shape configured to surround a kill beam of a roof frame of the fuselage, and
a second end coupled to, and overlapping with, a front portion of the spar cover.

16. The wing load support structure according to claim 15, wherein the center bulk head comprises a lower bulk head coupled to the upper bulk head, and
wherein the lower bulk head comprises:
a portion, with a "U" shape cross-section, that forms an inner region with the upper bulk head,
a first end coupled between the kill beam and the upper bulk head, and
a second end coupled to overlap the upper bulk head and the front portion of the spar cover.

\* \* \* \* \*